Sept. 15, 1959 G. A. NEFF 2,904,776

INFORMATION STORAGE SYSTEM

Filed March 22, 1954 2 Sheets-Sheet 1

INVENTOR.
GLYN A. NEFF

BY James B. Christie

ATTORNEY

INVENTOR.
GLYN A. NEFF
BY James B. Christie
ATTORNEY

United States Patent Office 2,904,776
Patented Sept. 15, 1959

2,904,776

INFORMATION STORAGE SYSTEM

Glyn A. Neff, Pasadena, Calif., assignor, by mesne assignments, to Consolidated Electrodynamics Corporation, Pasadena, Calif., a corporation of California Application March 22, 1954, Serial No. 417,677

13 Claims. (Cl. 340—174)

This invention relates to an improved method and apparatus for storing information, and more particularly to an improved method and apparatus for impressing information upon and reading information from a storage means.

In many instances in the field of data processing, it is desirable to temporarily store a quantity of information. Most frequently this information is in the form of electrical impulses which are coded to indicate numbers or digits. Some sources of digital information are constructed so that they provide digit after digit in time sequence. In order to process such information as, for example, where it is desired to perform certain arithmetic operations on the information, it is desirable to place the digital information occurring during a given time interval in temporary storage for future reference. For convenience, the digits appearing within a predetermined interval may be termed a block of information.

In some applications, a block of information is impressed upon a storage means such as a rotating drum having a magnetizable periphery or a magnetic tape. Most of these systems use some form of binary coding of the digits so that two selected degrees or polarities of magnetization on the storage means indicate binary digits.

The problem to which the present invention is directed arises where it is desired to continuously record blocks of information on a storage means and at the same time to continuously derive a previously recorded block of information from the same storage means. One method which has been employed is to divide the drum into two separate portions, each of which is recorded with a block of information. By alternately recording one portion while reading from another portion, the drum may be continuously and simultaneously used for both recording and reading. However, some external switching means for selecting the portion of the drum to be recorded and the portion to be read from, along with two sets of recording heads and reading heads are required.

My invention provides an improved method and apparatus for temporarily storing information in a recirculating storage medium whereby information may be continuously and simultaneously recorded and read from the storage medium with only one set of recording heads and one set of pickup heads.

In accordance with my invention, the digits of a given number of blocks of information are recorded in interleaved fashion in sectors of a recirculating storage means. Thus, a plurality of blocks of information may be effectively interlaced along a recirculating storage means. In a particular embodiment, the digits of a first block of information appearing one by one are recorded in every other sector of a rotating magnetic drum by means of recording heads which are energized by every other clock pulse from a clock track having clock pulses corresponding to each sector of the magnetic drum. Alternate sectors are thereby identified and the recording heads are energized accordingly to record the first block of information in alternate sectors. After the first block of information is recorded, a switching circuit energizes the recording heads for every other clock pulse which identifies a sector lying between those which were previously recorded so that the digits of a second block of information are recorded in interlaced fashion between the sectors containing the digits of the first block of information.

Other features of advantage of the present invention will be apparent upon a reading of the following specification in connection with the drawings in which.

Figure 1:
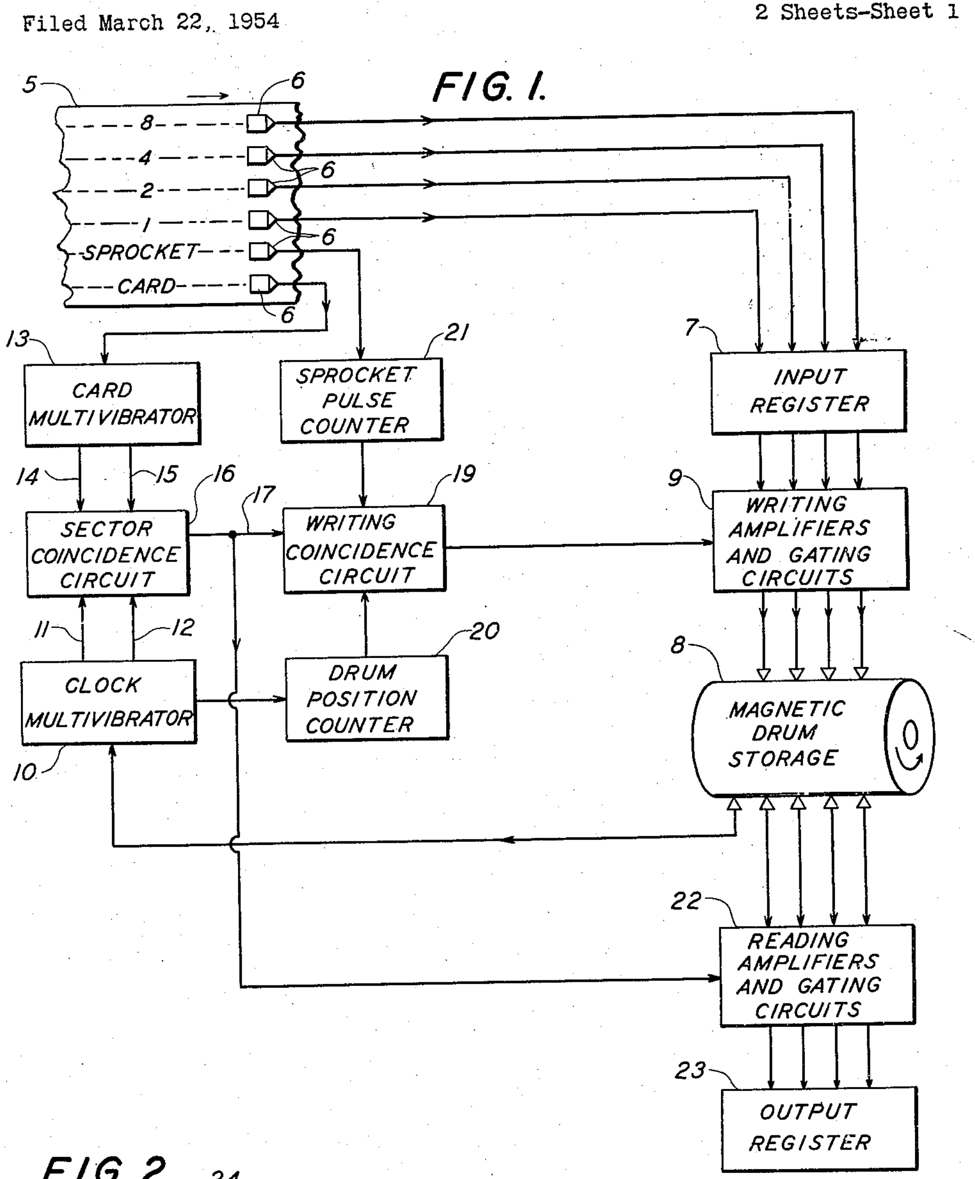
Fig. 1 is a block diagram of an embodiment of the present invention.

Turning in detail to Fig. 1, a source of time-series digital information may be provided by means of a previously recorded magnetic tape 5 or the like, which is adapted to be passed beneath a plurality of magnetic pickup heads 6. As shown, the magnetic tape is recorded with binary coded digits occurring in time-sequence. In addition, a sprocket pulse track is adapted to provide a sprocket pulse coincident in time with each of the binary coded digits, and a card pulse track is adapted to provide pulses for identifying separate blocks of information.

The binary coded digits from the magnetic tape 5 may be applied to an input register 7 which is adapted to register each of the digits in time-sequence as they appear on the magnetic tape 5. The registrations appearing in the input register 7 are recorded on the magnetic drum 8 after passing through the writing amplifiers and gating circuits 9.

A separate track around the magnetic drum 8 provides clock pulses which correspond to each of the separate sectors of the magnetic drum. These clock pulses are applied to a clock multivibrator 10 which may comprise a conventional bi-stable switching device such as, an Eccles-Jordan multivibrator. In one stable state, the clock multivibrator 10 provides a given signal on the lead 11 while in the other stable state the clock multivibrator 10 provides a given signal on the lead 12. Thus, the condition of the leads 11 and 12 is alternated in synchronism with the clock pulses.

A card multivibrator 13, which may be of similar construction to the clock multivibrator 10, has its condition of operation reversed upon the arrival of each card pulse. Thus, during the interval of one block of information, the lead 14 will be in one condition of operation while the lead 15 will be in another condition of operation and during the next succeeding block of information the conditions of operation of the leads 14 and 15 will be reversed.

A sector coincidence circuit 16 is adapted to provide a signal on lead 17 in accordance with the conditions of operation of the clock multivibrator 10 and the card multivibrator 13.

Assuming that a block of information is to be recorded on alternate sectors of the magnetic drum 8, the sector coincidence circuit 16 will be in a condition where every other clock pulse enables the writing coincidence circuit 19 to sense coincidence between a sprocket pulse counter 21 and a drum position counter 20.

By means of pulses derived from the clock multivibrator 10, the drum position counter 20 is adapted to count every other sector of the magnetic drum 8 passing under the magnetic recording heads associated therewith so that the drum position counter 20 keeps step with the position of the magnetic drum 8. The sprocket pulse counter 21 is adapted to count the sprocket pulses occurring along the magnetic tape 5 so as to provide a registration of the number of digits which have been read from the magnetic tape 5 within a given block. By making the maximum number of counts of the sprocket pulse counter 21 equal to the number of digits in a block of information, or by resetting the sprocket pulse counter 21 to 0 upon the arrival of each card pulse by some suitable means (not shown), the sprocket pulse counter 21 provides a registration of the number of digits which have been read from the tape 5 within any given block of information occurring between two card pulses. The writing coincidence circuit 19 compares the registration in the sprocket pulse counter 21, the registration in the drum position counter 20 and the condition of the sector coincidence circuit 16, and supplies a gating signal to the gating circuits 9 when the sector of the magnetic drum 8 corresponding to a selected position is under the recording heads. At this instant the gating circuits 9 are enabled to pass the registration in the input register 7 and it is recorded in the selected sector of the magnetic drum 8.

The next succeeding sector of the magnetic drum 8 is skipped for recording. However, during the sector skipped for recording the signal appearing on the lead 17 not only disables the writing coincidence circuit 19 but also enables the reading amplifiers and the gating circuits 22 to pass any digit which may appear in the sector lying under the reading heads to the output register 23. When the next sector is to be recorded the previous sequence of operation repeats so that the next succeeding digit appearing on the magnetic tape 5 is recorded in that sector of the magnetic drum 8. Thus the apparatus of the writing coincidence circuit 19, and the reading amplifiers in gating circuits 22, are alternately enabled by the signal provided by the sector coincidence circuit 16.

It will be appreciated that the invention is not limited to recording information in sequence in alternate sectors around the magnetic drum 8. Suitable means for identifying the address or sector in which a particular piece of information is to be recorded or a position from which a particular piece of information is to be derived may be included. However, in the illustrative embodiment, the sequence of recording on alternate sectors of the magnetic drum 8 proceeds until a block including a predetermined number of digits is recorded on the magnetic drum and a card pulse occurs.

Upon the arrival of the card pulse thereby identifying a new block of information, the card multivibrator 13 changes its condition of operation and the sector coincidence circuit 16 provides a gating signal on the lead 17 which will alternately enable the writing coincidence circuit 19 and the reading amplifiers and gating circuit 22. However, the phasing of the signal from the sector coincidence circuit 16 is such that the writing coincidence circuit 19 is enabled to allow recording in sectors which were skipped for recording during the previous block of information. In a manner similar to that previously described, the ensuing block of information is recorded on the magnetic drum 8 in the alternate sectors lying between those which were previously recorded while the previously recorded block of information appears in the output register 23. It will be appreciated that other methods for deriving the information from alternate sectors of the magnetic drum may be employed. For example, in one system, described in detail in the co-pending patent application of Robert L. Sink and Glyn A. Neff, Serial No. 402,126, filed January 4, 1954, entitled Data Processing Apparatus, a commutating arrangement for energizing selected portions of a storage register in sequence with corresponding sectors of the magnetic drum lying under the reading heads is employed and the information is derived from the magnetic drum in accordance with the value of the information rather than its location. A limitation on the means for deriving the information from the magnetic drum is that the rate of information input to the magnetic drum cannot exceed the rate at which information is derived.

Figure 2:
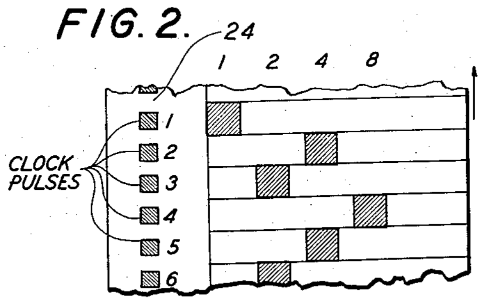
Fig. 2 is a diagrammatic representation of a section of the magnetic drum of Fig. 1.

Fig. 2 is a diagrammatic representation of a portion of the magnetic drum 8 illustrating the manner in which it may be recorded; the lined areas indicating one condition of magnetization, while the unlined areas indicate another condition of magnetization. It will be noted that the clock pulse track 24 provides a magnetic indication which is coincident with each of the sectors. In the first set of alternate sectors corresponding to the clock pulse numbered 1, 3, and 5, the digits 1, 2 and 4 have been recorded, while in the second set of alternate sectors corresponding to the clock pulse numbered 2, 4 and 6, the digits 4, 8 and 2 have been recorded. Thus, in accordance with the invention, the numerals 1, 2 and 4 may be recorded in the first set of alternate sectors during the same interval in which the digits 4, 8 and 2 are derived from the second set of alternate sectors. During the next succeeding block of information, information may be recorded in the second set of alternate sectors, while the digits 1, 2 and 4 are derived from the first set of alternate sectors.

Although the apparatus has been described with reference to a binary coded system of digit notation, it will be appreciated that the invention is not limited to any particular type of information notation. Nor is the invention limited to the recording of only two blocks of information in a storage means such as the magnetic drum 8. By replacing the clock multivibrator 10 and the card multivibrator 13 with suitable counters or circuits having a number of stable states corresponding to the number of blocks of information to be interleaved around the magnetic drum, the apparatus shown in Fig. 1 may be readily adapted to interleave any desired number of blocks of information.

Although circuitry for performing the function of each of the portions of Fig. 1 is well known, the following detailed description of one workable arrangement for performing the function of the card multivibrator 13, the clock multivibrator 10, and the sector coincidence circuit 16 is given.

Figure 3:
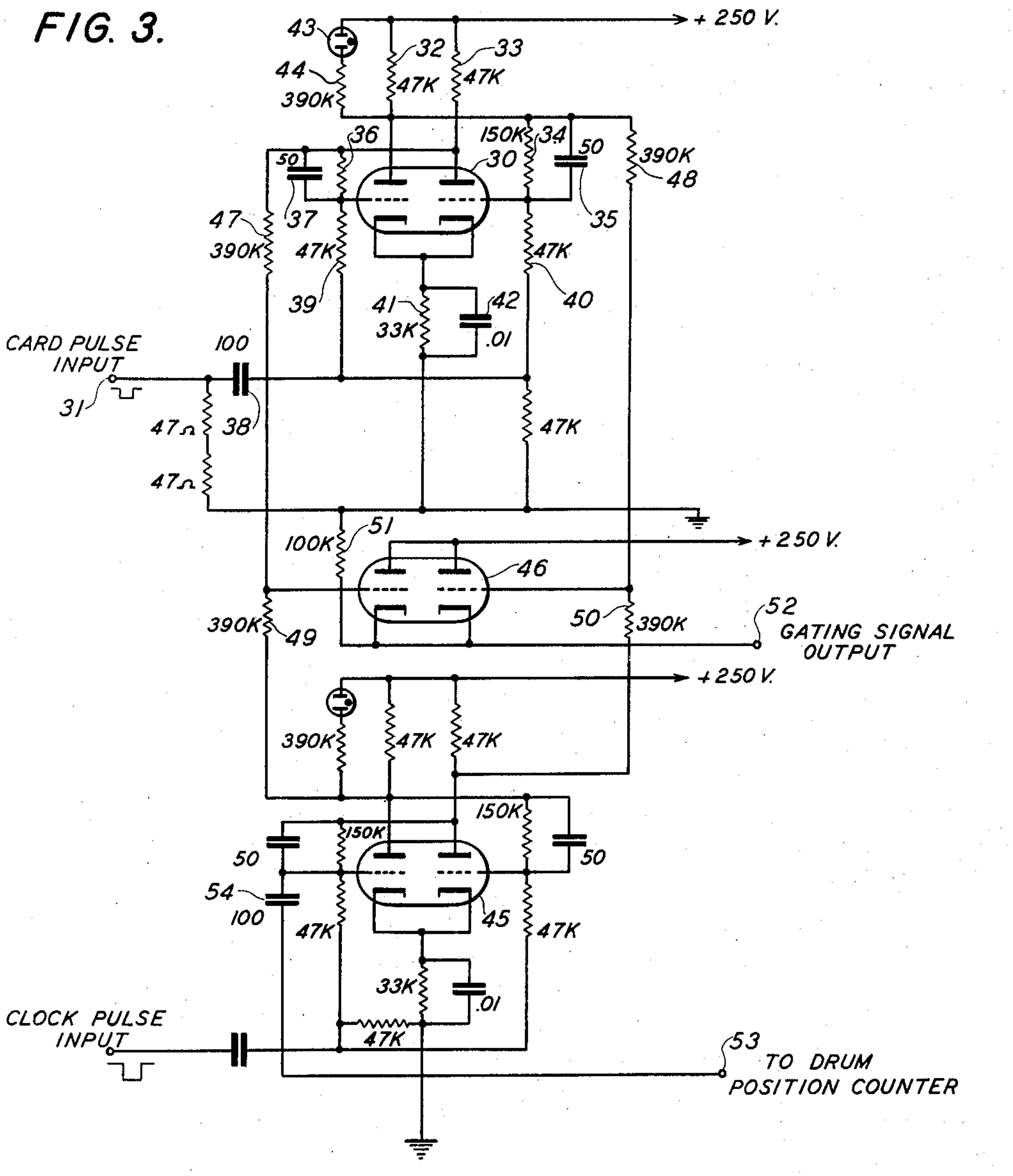
Fig. 3 is a schematic circuit diagram of a portion of the apparatus of Fig. 1.

Turning in detail to Fig. 3, an electron tube 30, which may include two separate sections, in combination with its associated circuitry, provides a bi-stable switching circuit for performing the function of the card multivibrator.

The card pulses derived from the magnetic tape 5 may be amplified by a suitable means (not shown) and applied to a terminal 31 of Fig. 3 in negative polarity. On the arrival of each of these pulses, the two sections of the electron tube 30 are alternately rendered conducting.

Each of the anodes of the electron tube 30 is connected to a suitable source of operating potential via a resistor 32 and 33, respectively. In addition, each of the anodes is cross-coupled to the control electrode of the opposite section via a suitable impedance comprising the parallel combination of a resistance 34 and a capacitance 35 and a resistance 36 and a capacitance 37. The negative card pulses applied to the terminal 31 are coupled to the control electrodes of the electron tube 30 via a coupling capacitance 38 and the grid resistances 39 and 40. Both sections of the electron tube 30 are biased by means of a common cathode resistance 41 and a by-pass capacitance 42.

Assuming that the left-hand section of the electron tube 30 is conducting while the right-hand section is cut off, the negative card pulse coupled to the control electrode of the left-hand section will tend to decrease the conduction in this section. The anode of the left-hand section will then tend to go positive, and since the anode is coupled to the control electrode of the right-hand section, the control electrode of the right-hand section will tend to go positive. This will tend to increase conduction in the right-hand section of the electron tube 30, thereby causing the anode of the right-hand section to go negative, and the negative excursion will be transferred to the control electrode of the left-hand section, thereby tending to decrease further conduction in the left-hand section. This action continues until the left-hand section is cut off and the right-hand section is conducting. Upon the arrival of the next negative card pulse at the terminal 31, the above sequence will be repeated until the right-hand section is cut off and the left-hand section is rendered conducting. In order to indicate which section is conducting, a neon indicating light 43 connected serially with a resistance 44 may be connected across the plate resistance 32 of one of the sections as shown.

The function of the clock multivibrator 10 of Fig. 1 is provided by an electron tube 45 along with its associated circuitry. Since the operation of the electron tube 45 is identical to that discussed above with respect to the electron tube 30, no further explanation is believed necessary.

A double section electron tube 46 provides one suitable means for comparing the condition of the card multivibrator 13 and the clock multivibrator 10. The anode of the right-hand section of the electron tube 30 is coupled to the control electrode of the left-hand section of the electron tube 46 via a resistance 47, while the anode of the left-hand section of the electron tube 30 is coupled to the control electrode of the right-hand section of the electron tube 46 via a resistance 48.

Wtih respect to the connections between the electron tube 45 and the coincidence circuit electron tube 46, the anode of the left-hand section of the electron tube 45 is coupled to the control electrode of the left-hand section of the electron tube 46 via a resistance 49 and the anode of the right-hand section of the clock multivibrator electron tube 45 is coupled to the control electrode of the right-hand section of the coincidence circuit electron tube 46 via a resistance 50.

In operation, the voltage appearing at the anode of the left-hand section of the electron tube 45 is effectively added to the voltage appearing at the anode of the right-hand section of the electron tube 30. This addition is accomplished at the control electrode of the left-hand section of the coincidence circuit electron tube 46.

Figure 4:
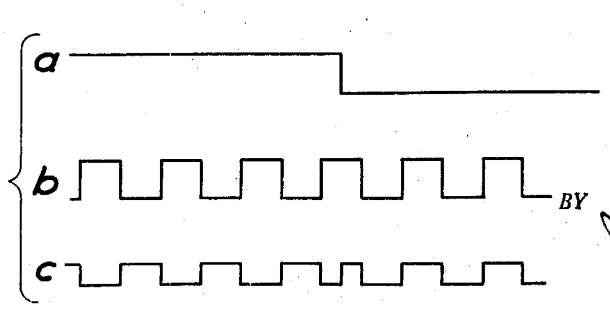
Fig. 4 is a graphical illustration of certain voltages appearing in the circuitry of Fig. 3.

The coincidence circuit electron tube 46 compares in its left-hand section the condition of operation of the left-hand section of the electron tube 45 and the right-hand section of the electron tube 30. Also, the right-hand section of the electron tube 46 compares the condition of operation of the right-hand section of the electron tube 45 and the left-hand section of the electron tube 30. When the conditions of operation of the electron tube 30 and the electron tube 45 are identical, a voltage of a given level appears at the gating signal output terminal 52, and when the conditions of conduction in the electron tube 30 and the electron tube 45 are not identical a voltage of a higher level is provided at the terminal 52. This is accomplished by effectively adding the voltages appearing at the anodes of opposite sections of the electron tubes 30 and 45 at the control electrodes of the coincidence circuit electron tube 46. Thus, when the signal applied to the control electrode of the left-hand section of the coincidence circuit electron tube 46 from the right-hand anode of the electron tube 30 as is shown in Fig. 4*a* and the voltage applied to the control electrode of the left-hand section of the coincidence circuit electron tube 46 from the left-hand anode of the electron tube 45 as is shown in Fig. 4*b*, the voltage across the cathode resistor 51 which appears at the terminal 52 will be as shown in Fig. 4*c*.

The voltage of Fig. 4*c* may be applied to the writing coincidence circuit 19 and the reading amplifiers and gating circuits 22 of Fig. 1 via suitable amplifiers, if desired, to perform the gating functions discussed with reference to Fig. 1.

In order to provide a signal for driving the drum position counter 20 of Fig. 1, the voltage appearing at one of the control electrodes of the electron tube 45 may be coupled to an output terminal 53 via a suitable coupling capacitance 54.

Although specific circuit values are shown in Fig. 3, it will be appreciated that these are given by way of example, being indicative only by those values which were employed in one successful embodiment. The capacitance values are in micro-farads when the value given is less than 1; the capacitance values are in micro-micro-farads when the value given is greater than 1; and the resistance values are in ohms (Ω), where $K=1{,}000$.

I claim:

1. Apparatus for temporarily storing information occurring in time series comprising in combination a storage means having a first set of alternate sectors and a second set of alternate sectors interleaved with said first set of alternate sectors, a recording means associated with said storage means, means energizing said recording means when each of said first set of alternate sectors is adjacent said recording means during a first predetermined interval, whereby information is recorded in said first set of alternate sectors only, means energizing said recording means during a second predetermined interval immediately succeeding said first predetermined interval when each of said second set of alternate sectors are adjacent said recording means whereby information is recorded in said second set of alternate sectors during said second predetermined interval only, a reading means associated with said storage means, means energizing said reading means when each of said second set of alternate sectors is adjacent said reading means during said first predetermined interval whereby the information recorded in said second set of alternate sectors is derived from said storage means and means energizing said reading means when each of said first set of alternate sectors is adjacent said reading means during said second predetermined interval whereby the information appearing in said first set of alternate sectors is derived from said storage means.

2. Apparatus for temporarily storing information occurring in time series comprising in combination, a storage means having a plurality of separate sectors, means recording in alternate ones of said plurality of sectors during a first predetermined interval in time, means recording in alternate ones of said plurality of sectors interleaved with said first named alternate ones during a second predetermined interval in time, means reading from said interleaved alternate sectors during said first predetermined interval in time, and means reading from said first named alternate sectors during said second predetermined interval in time.

3. Apparatus in accordance with claim 2 in which said recording means for recording said first named alternate sectors and said recording means for recording said interleaved alternate sectors includes recording apparatus disposed adjacent said storage means, means energizing said recording apparatus when said first named alternate sectors are adjacent said recording apparatus during said first predetermined interval in time, and means energizing said recording apparatus when said interleaved sectors are adjacent said recording apparatus during said second predetermined interval in time.

4. Apparatus in accordance with claim 2 in which said reading means for reading said first named alternate sectors and said reading means for reading said interleaved alternate sectors comprises reading apparatus disposed adjacent said storage means, means for energizing said reading apparatus when said interleaved alternate sectors are adjacent said reading means during said first predetermined interval in time, and means energizing said reading apparatus when said first named alternate sectors are adjacent said reading apparatus during said second predetermined interval in time.

5. Apparatus for temporarily storing time series digital information including in combination, a source of time series digital information, a storage means, recording apparatus associated with said storage means, a gating means connected serially between said source of digital information and said recording means, means intermittently energizing said gating means whereby digital information from said source is recorded on said storage means in areas spaced apart, means energizing said gating means whereby said digital information is recorded on said storage means in the areas lying between said first named recording areas, reading apparatus associated with said storage means, an output device, gating means coupled serially between said reading means and said output device, means energizing said gating means whereby the first recorded information is read from the storage means and supplied to the output device, and means energizing said reading gating means whereby the second recorded information is read from said storage means and supplied to said output device.

6. Apparatus for recording digital information including in combination, a rotating magnetic drum having a magnetizable periphery, recording apparatus disposed adjacent said magnetizable periphery for magnetizing selected areas of said magnetic drum in accordance with electrical signals as the drum passes the recording apparatus, a source of electrical signals representing time series digital information, writing gating circuits coupled between said source of digital information and said recording apparatus, means synchronized with rotation of the drum for energizing said writing gating means during intermittent intervals whereby equally spaced areas of said magnetic drum are recorded with digital information from said source during a first predetermined interval, means synchronized with rotation of the drum for energizing said writing gating means during intermittent intervals during a subsequent revolution of the drum, and means for phasing the intermittent writing intervals on the subsequent rotation with relation to the spaced areas in which information was written during said first interval, whereby digital information from said source of digital information is recorded on areas of said magnetic drum which are interleaved with said equally spaced areas.

7. Apparatus for storing digital information including the combination of, a magnetic drum having a first set of sectors spaced around said drum and a second set of sectors interspersed with said first set of sectors around said drum, a clock track surrounding said magnetic drum and adapted to provide an indication coincident with each of said first set and each of said second set of sectors, a source of time series digital information, said source being adapted to provide a sprocket pulse coincident in time with each digit of the time series digital information supplied by said source, recording apparatus disposed adjacent said magnetic drum, writing gating means coupled between said source of digital information and said recording means, means deriving clock pulses from the clock track surrounding said magnetic drum, a drum position counter coupled to said clock pulse deriving means for counting every other of said clock pulses, said drum position counter being adapted to count to a predetermined number equal to one-half of the total number of sectors on said magnetic drum in synchronism with said clock pulses, a sprocket pulse counter coupled to said source of digital information for counting said sprocket pulses, a writing coincident circuit coupled to said sprocket pulse counter and to said drum position counter for sensing the condition where the number in the sprocket pulse counter equals the number in the drum position counter, means energizing said writing gating circuits when said writing coincidence circuit senses the number in the sprocket pulse counter and the number in the drum position counter are equal and every other clock pulse occurs whereby the first set of sectors of said magnetic drum is recorded with a first block of digital information, and means energizing said writing gating circuits when said writing coincidence circuit indicates that the number in the sprocket pulse counter is equal to the number in the drum position counter and a clock pulse occurs which is interspersed in time with respect to said every other alternate clock pulse whereby the second set of sectors of said magnetic drum is recorded with a second block of information.

8. Apparatus in accordance with claim 7 including reading apparatus disposed adjacent said magnetic drum for reading from the magnetic drum the digital information recorded thereon, an output device, reading gating circuits connected serially with said reading apparatus and said output device, and means energizing said reading gating means in response to every other clock pulse whereby the information recorded in the second set of sectors of said magnetic drum is supplied to said output device, and means energizing said reading gating means in response to the clock pulse interspersed between said every other clock pulse, whereby said first block of information recorded in said second set of sectors is supplied to said output device.

9. Apparatus for storing information occurring in time series comprising in combination, a storage means having a plurality of separate sectors, means recording in selected ones of said plurality of sectors equally spaced along said storage means during a first predetermined interval in time, means recording in selected ones of said plurality of sectors interleaved with said first named selected ones during subsequent predetermined intervals in time, means reading from selected ones of said interleaved selected sectors during said first predetermined interval in time, and means reading from said first named selected sectors during at least one of said subsequent predetermined intervals in time.

10. Apparatus in accordance with claim 9 in which said recording means for recording said first named selected sectors and said recording means for recording said interleaved selected sectors includes recording apparatus disposed adjacent said storage means, means, energizing said recording apparatus when said first named selected sectors are adjacent said recording apparatus during said first predetermined interval in time, and means energizing said recording apparatus when said interleaved selected sectors are adjacent said recording apparatus during at least one of said subsequent predetermined intervals in time.

11. Apparatus in accordance with claim 9 in which said reading means for reading said first named selected sectors and said reading means for reading said interleaved selected sectors comprises reading apparatus disposed adjacent said recirculating storage means, means for energizing said reading apparatus when said interleaved selected sectors are adjacent said reading means during said first predetermined interval in time, and means energizing said reading apparatus when said first named selected sectors are adjacent said reading apparatus during at least one of said subsequent predetermined intervals in time.

12. Apparatus for storing digital information including the combination of, a magnetic drum having a plurality of sets of interleaved sectors spaced around said drum, a clock track surrounding said magnetic drum and adapted to provide an indication coincident with each of the sectors of said plurality of sets of sectors, a source of time-series digital information which is adapted to provide a sprocket pulse coincident in time with each digit of the time-series digital information supplied by said source, recording apparatus disposed adjacent said magnetic drum, writing gating means coupled between said source of digital information and said recording means, means deriving clock pulses from the clock track surrounding said magnetic drum, a drum position counter coupled to said clock pulse deriving means for counting up one upon the receipt of a group of said clock pulses equal in number to the number of said plurality of sets of interleaved sectors, said drum position counter being adapted to count in synchronism with said groups of clock pulses to a predetermined number equal to the total number of sectors on said magnetic drum divided by the number of said plurality of sets of sectors, a sprocket pulse counter coupled to said souce of digital information for counting said sprocket pulses, a writing coincidence circuit coupled to said sprocket pulse counter and to said drum position counter for sensing the condition where the number in the sprocket pulse counter equals the number in the drum position counter, means energizing said writing gating circuits when said writing coincidence circuit senses the number in the sprocket pulse counter and the number in the drum position counter are equal and each clock pulse occurs corresponding to the sectors of a first set of said plurality of sets of interleaved sectors whereby the first set of sectors of said magnetic drum is recorded with a first block of said plurality of blocks of digital information, and means energizing said writing gating circuits when said writing coincidence circuits indicate that the number in the sprocket pulse counter is equal to the number in the drum position counter and each clock pulse occurs corresponding to the sectors of another of said plurality of sets of sectors whereby subsequent blocks of said plurality of blocks of digital information are recorded in the others of said plurality of sets of sectors on said magnetic drum.

13. Apparatus for storing digital information bits occurring in time sequence comprising a rotary magnetic storage device, means for recording on a track on the magnetic storage device, means synchronized with the rotation of the storage device for transferring a first group of information bits serially to the recording means for recording the bits on the track during one revolution of the storage device, and means synchronized with the rotation of the storage device for transferring a second group of information bits serially to the recording means for recording bits on the same track during a subsequent revolution of the storage device, the information bits of the second group being recorded in positions intermediate bits of the first group on the track of the magnetic storage device.

References Cited in the file of this patent

UNITED STATES PATENTS

| | | |
|---|---|---|
| 1,799,627 | Knoop | Apr. 7, 1931 |
| 1,832,308 | Knoop | Nov. 17, 1931 |
| 2,207,744 | Larson | July 16, 1940 |
| 2,614,169 | Cohen | Oct. 14, 1952 |
| 2,682,574 | Canfora et al. | June 29, 1954 |
| 2,700,148 | McGuigan | Jan. 18, 1955 |

OTHER REFERENCES

Universal High-Speed Digital Computers: A Magnetic Store, by Prof. F. C. Williams, T. Kilburn, and G. E. Thomas; Proceedings Institute of Electrical Engineering, April 1952.

Disclaimer 2,904,776.—*Glyn A. Neff*, Pasadena, Calif. INFORMATION STORAGE SYSTEM. Patent dated Sept. 15, 1959. Disclaimer filed Aug. 10, 1962, by the assignee, *Consolidated Electrodynamics Corporation*.

Hereby enters this disclaimer to claims 5 and 6 of said patent.

[*Official Gazette September 18, 1962.*]